(12) United States Patent
Tsuji

(10) Patent No.: US 6,919,915 B2
(45) Date of Patent: Jul. 19, 2005

(54) CARRIER-RELATED INFORMATION MANAGEMENT SYSTEM AND IMAGE READING APPARATUS

(75) Inventor: Junichi Tsuji, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 524 days.

(21) Appl. No.: 10/107,470

(22) Filed: Mar. 28, 2002

(65) Prior Publication Data

US 2002/0140808 A1 Oct. 3, 2002

(30) Foreign Application Priority Data

Mar. 29, 2001 (JP) ........................................ 2001-097683
Feb. 21, 2002 (JP) ........................................ 2002-044994

(51) Int. Cl.⁷ .............................................. H04N 5/253
(52) U.S. Cl. ......................... 348/96; 348/97; 358/474; 358/482; 358/483; 358/494; 355/32; 355/33; 355/40; 355/18
(58) Field of Search ..................... 348/96, 97; 358/494, 358/474, 482, 483; 355/32, 33, 40, 18

(56) References Cited

U.S. PATENT DOCUMENTS 5,973,765 A * 10/1999 Uchiyama et al. ............. 355/40
6,247,857 B1 * 6/2001 Wheeler et al. ............. 396/567
6,407,829 B1 * 6/2002 Nakamura ................. 358/494

\* cited by examiner

*Primary Examiner*—Shawn An
(74) *Attorney, Agent, or Firm*—Sughrue Mion, PLLC

(57) ABSTRACT

A system for managing information on a carrier, and an image reading apparatus, which enable easy resetting of correction data. When a film carrier is mounted in an image reading apparatus main body, a control section reads the identification number of the film carrier from an EEPROM, and determines whether the identification number corresponds to any of the identification numbers stored in a RAM. When correspondence is not found, it determines that the film carrier is mounted in the main body for the first time, and correction data is read from the EEPROM and stored in the RAM with the identification number. Instead of losing the correction data if the substrate is replaced, the correction data stored in the RAM is read from the control section and written into a new EEPROM, thereby enabling easy resetting of the correction data.

9 Claims, 13 Drawing Sheets

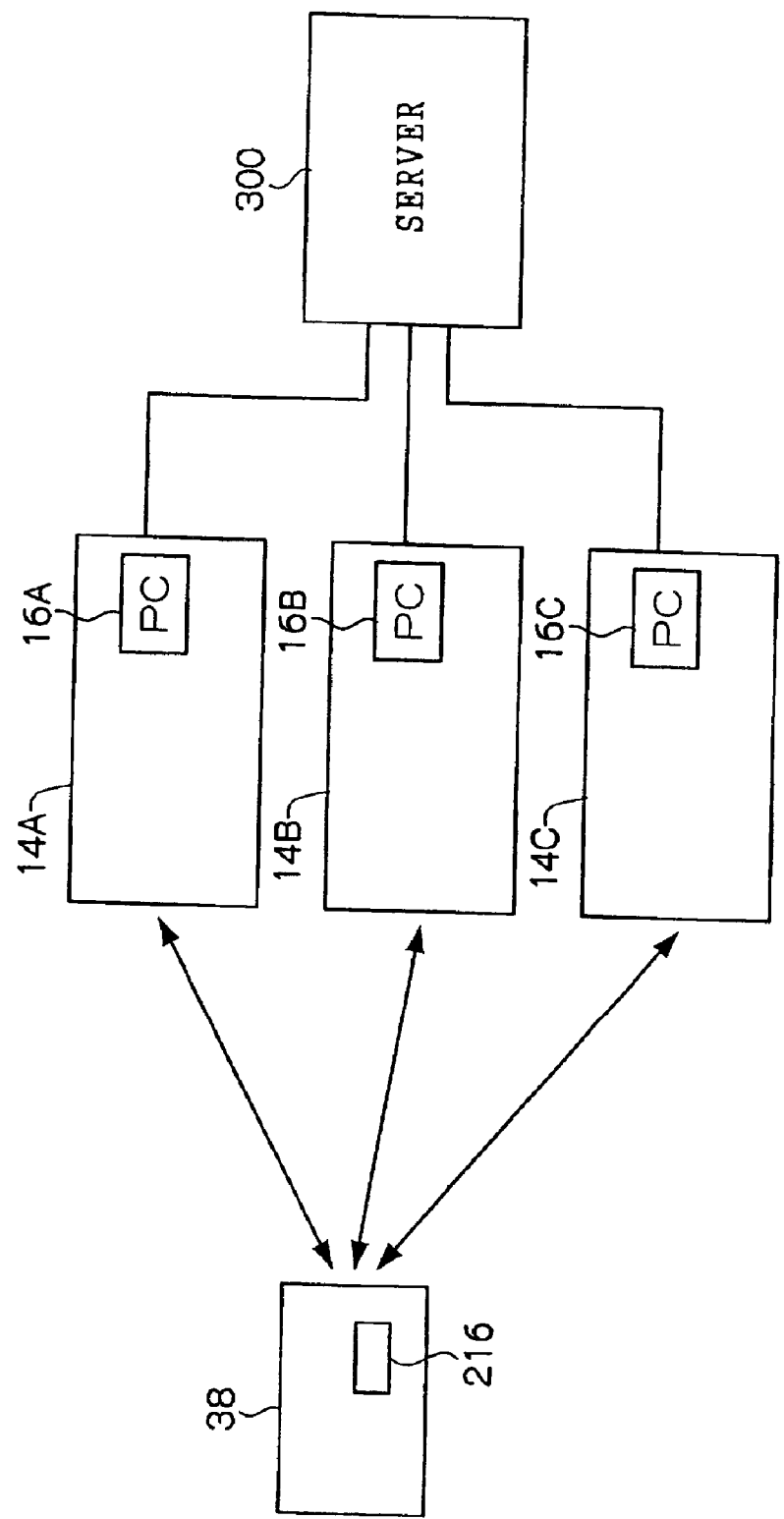

CARRIER-RELATED INFORMATION MANAGEMENT SYSTEM AND IMAGE READING APPARATUS

BACKGROUND OF THE INVENTION

1. Field of the Invention

The present invention relates to a system for managing information on a carrier which carries an image recording medium, and to an image reading apparatus.

2. Description of the Related Art

A photographic processing apparatus, which reads an image recorded on a photographic film by separating the image into red, green, and blue color components (R, G, and B), subjects the image data obtained by the reading to image processings such as correction and then prints the image on a recording material or displays the image on a display, has been proposed.

A film carrier is provided in the photographic processing apparatus for conveying the photographic film over a scanning section at a predetermined speed so that an image recorded on the elongated or sheet-shaped photographic film can be accurately read by a CCD sensor at high speed.

Film carriers have unique characteristics. Correction data for these characteristics such as the frame-conveying capability, the focusing position, the output of a film detection sensor, and the like are inspected and stored in advance in an EEPROM mounted on a substrate of the film carrier. Therefore, when the film carrier is mounted in the image reading apparatus, accurate image reading can be carried out by an image reading apparatus main body reading the correction data from the EEPROM and controlling the driving of the film carrier based on the correction data.

In the conventional structure of the film carrier, when the substrate of the film carrier breaks down, the correction data can still be used by removing the EEPROM from the substrate and mounting it onto a new substrate. However, recently, removal of the EEPROM mounted on the substrate has become difficult. Thus, when the substrate is replaced, the EEPROM mounted on the substrate is also replaced. As a result, when the substrate is replaced, the correction data for the film carrier needs to be inspected again, and the inspected correction data needs to be stored in a new EEPROM, thereby complicating resetting of the correction data.

Feedback of information corresponding to how the film carrier has been used (i.e., history) to a factory or the like is useful for the repairs and development of the film carrier.

However, a personal computer of the image reading apparatus main body, rather than the film carrier, stores the information on the use of the film carrier (such as the number of frames which have been read, the number of rotations of motors to convey the frame, and the like). Therefore, a problem arises in that such information cannot be obtained from the broken film carrier when the film carrier is sent back to the factory.

In a shop (laboratory) where a plurality of image reading apparatuses are used, a single film carrier may be used by all of the image reading apparatuses. In such a case, information on the use of the film carrier is stored in the respective image reading apparatuses. Therefore, it has been difficult to obtain accurate information on the use of the film carrier.

The information on the use of the film carrier can be stored in the film carrier. However, since the film carrier is removed from the image reading apparatus main body after image reading, a problem arises in that there is no appropriate time, during which the information on the use of the film carrier is read from the image reading apparatus main body and written into the film carrier. Although the information can be written into the film carrier the next time the film carrier is mounted in the image reading apparatus main body, this is undesirable in terms of time lag.

Namely, accurate management of the information on the use of the film carrier and feedback of the information to the factory or the like are desirable.

SUMMARY OF THE INVENTION

In view of the above-described facts, an object of the present invention is to provide a system for managing information on a carrier, and an image reading apparatus, which are able to easily reset correction data stored in a carrier. Another object of the present invention is to provide a system for managing information on a carrier, which system accurately manages information on the use of the carrier.

A first aspect of the present invention is a system for managing information on a carrier, comprising: a carrier for holding an image recording medium; a carrier storage component provided with the carrier and storing correction data unique to the carrier; an image reading apparatus which reads image information corresponding to the image recording medium held by the carrier when the carrier is mounted in the image reading apparatus; and an information management component which, if the information management component has no correction data for the carrier mounted in the image reading apparatus, reads the correction data for the carrier from the carrier storage component and stores the data, wherein, if the carrier storage component is replaced, the correction data for the carrier is read from the information management component and written into the replacement carrier storage component when the carrier is mounted in the image reading apparatus.

According to the first aspect, when the carrier is mounted in the image reading apparatus, it is determined whether the correction data for the carrier is stored in the information management component. When the determination is negative, the correction data for the carrier is read from the carrier storage component and written into the information management component. Accordingly, even when the carrier storage component of the carrier is replaced and the correction data is lost, after a new carrier is mounted in the apparatus, the correction data stored in the carrier can be easily reset by reading the correction data for the carrier from the information management component and writing the data into a new carrier storage component.

A second aspect of the invention is a system for managing information on a carrier according to the first aspect, wherein the information management component reads the identification number unique to the carrier and the correction data from the carrier storage component and stores them, and it is determined, at the time of mounting the carrier in the image reading apparatus, whether the correction data for the carrier has been already stored in the information management component, based on whether the identification number read from the carrier storage component corresponds to at least one of the identification numbers stored in the information management component.

According to the second aspect, it is determined whether the carrier is a carrier whose correction data has been stored, by reading the identification number from the carrier storage component and determining whether the identification number corresponds to any of identification numbers stored in the information management component. Therefore, when the carrier is mounted in the apparatus, it can be easily determined, based on only the identification number, whether the correction data should be read from the information management component and written into the carrier storage component.

A third aspect of the present invention is a system for managing information on a carrier according to the first or second aspect, wherein the information management component is disposed with the image reading apparatus.

According to the third aspect, the information management component does not need to be disposed outside the image reading apparatus.

A fourth aspect of the present invention is a system for managing information on a carrier according to the first or second aspect, wherein the information management component is connected to a plurality of image reading apparatuses.

According to the fourth aspect, the information management component is connected to a plurality of image reading apparatuses. Therefore, the correction data for the carrier is stored in the information management component when the carrier is mounted in any of the image reading apparatuses. As a result, even when the carrier is mounted in a particular image reading apparatus for the first time, the correction data for the carrier can be read from the information management component and written into the carrier storage component.

A fifth aspect of the present invention is a system for managing information on a carrier, comprising: a carrier for holding an image recording medium; a carrier storage component provided with a carrier and storing correction data unique to the carrier; an image reading apparatus which reads image information of the image recording medium when the carrier is mounted in the image reading apparatus; and an information management component which, when the carrier is mounted in the image reading apparatus, detects information for the image reading, and adds the detected information to the information on the same carrier, which is stored in the information management component.

According to the fifth aspect, information on image reading, which is carried out by the image reading apparatus when the carrier is mounted in the image reading apparatus, is inputted from the respective image reading apparatuses to the information management component. Further, the information on the carrier can be added to the information on the same carrier stored in the information management component. Therefore, even when the same carrier is used by the image reading apparatuses, the information on the carrier can be accurately detected.

A sixth aspect of the present invention is a system for managing information on a carrier according to the fifth aspect, wherein, if the carrier breaks down, the information on the carrier, which has been added to the information in the information management component and stored therein, is written into the carrier storage component of the carrier.

According to the sixth aspect, when the carrier breaks down, the information on the carrier, which has been added to the information in the information management component and stored therein, is written into the carrier storage component of the carrier. Therefore, when the carrier is sent back to a factory, accurate information on (the history of) the carrier can be obtained from the carrier storage component of the carrier, and the obtained information can be used for repairs or carrier designs.

A seventh aspect of the present invention is a system for managing information on a carrier according to the first to sixth aspects, wherein the image reading apparatus having the correction data stored therein is operated based on the correction data, generates new correction data by adjusting the correction data, and reads, based on the new correction data, an image on the image recording medium held in the carrier.

According to the seventh aspect, when the carrier is mounted in the image reading apparatus, the image reading apparatus is adjusted based on the correction data unique to the carrier. For example, when a transmission sensor for detecting the presence of the image recording medium (photographic film) is disposed in the image reading apparatus, the threshold value for the amount of light for determining the presence of the image recording medium is adjusted.

Even after the adjustment, there has been the possibility that, for example, when the amount of light emitted from a light source decreases due to deterioration thereof, the presence of the image recording medium is erroneously detected due to a decrease in the amount of light transmitted through the image recording medium, even when the presence of the image recording medium is determined using the threshold value obtained based on the correction data.

According to the seventh aspect, the correction data is adjusted by operating the image reading apparatus which has been adjusted based on the correction data. Images can be well read based on the adjusted correction data.

An eighth aspect of the present invention is an image reading apparatus comprising: a carrier which holds and conveys an image recording medium for reading; a carrier storage component, which is provided inside the carrier, for storing correction data unique to the carrier; and a main storage component which, when the carrier is mounted in the image reading apparatus, reads the correction data from the carrier storage component and stores the data if it is determined that the carrier is mounted to the image reading apparatus for the first time, wherein, if the carrier storage component is replaced, the correction data stored in the main storage component is read out and written into the replacement carrier storage component.

In the image reading apparatus according to the eighth aspect, when the carrier is mounted in the image reading apparatus, it is determined whether the carrier is mounted in the image reading apparatus main body for the first time. When the determination is affirmative, the correction data for the carrier is read from the carrier storage component and written into the main body storage component. Accordingly, even when the carrier storage component of the carrier is replaced and the correction data is lost, after a new carrier is mounted in the apparatus main body, the correction data stored in the carrier can be easily reset by reading the correction data for the carrier from the main body storage component and writing the data into a new carrier storage component.

A ninth aspect of the present invention is an image reading apparatus according to the eighth aspect, wherein the main body storage component reads an identification number unique to the carrier and the correction data from the carrier storage component and stores them, and it is determined, at the time of mounting the carrier in the image reading apparatus, whether the correction data for the carrier has been already stored in the main storage component, based on whether the identification number read from the carrier storage component corresponds to at least one of the identification numbers stored in the information management component.

According to the ninth aspect, it is determined whether the carrier is a carrier whose correction data has been stored in the main body storage component, by reading the identification number from the carrier storage component and determining whether the identification number corresponds to any of identification numbers stored in the main body storage component. Therefore, when the carrier is mounted in the apparatus, it can be easily determined, based on only the identification number, whether the correction data should be read from the main body storage component and written into the carrier storage component.

A tenth aspect of the present invention is an image reading apparatus according to the eighth or ninth aspect, wherein the image reading apparatus having the correction data stored therein is operated based on the correction data, generates new correction data by adjusting the correction data, and reads, based on the new correction data, an image on the image recording medium held in the carrier.

According to the tenth aspect, when the carrier is mounted in the image reading apparatus main body, the image reading apparatus is adjusted based on the correction data unique to the carrier. For example, when a transmission sensor for detecting the presence of the image recording medium (photographic film) is disposed in the image reading apparatus, the threshold value for the amount of light for determining the presence of the image recording medium is adjusted.

Even after the adjustment, there has been the possibility that, for example, when the amount of light emitted from a light source decreases due to deterioration thereof, the presence of the image recording medium is erroneously detected due to a decrease in the amount of light transmitted through the image recording medium in the carrier, even when the presence of the image recording medium is determined using the threshold value obtained based on the correction data.

According to the tenth aspect, the correction data is adjusted by testing the operation of the image reading apparatus after adjustment thereof based on the correction data. Images can be well read based on the adjusted correction data (i.e., new correction data).

BRIEF DESCRIPTION OF THE DRAWINGS

FIG. 13 is a block diagram schematically showing the structure of a system for managing information on a film carrier relating to a second embodiment of the present invention.

DESCRIPTION OF THE PREFERRED EMBODIMENTS

First Embodiment

An image reading apparatus (system for managing information on a film carrier) relating to a first embodiment of the present invention will be described with reference to FIGS. 1 through 12.

[Outline of an Image Reading Apparatus having a Film Carrier Mounted therein]

Figure 1:
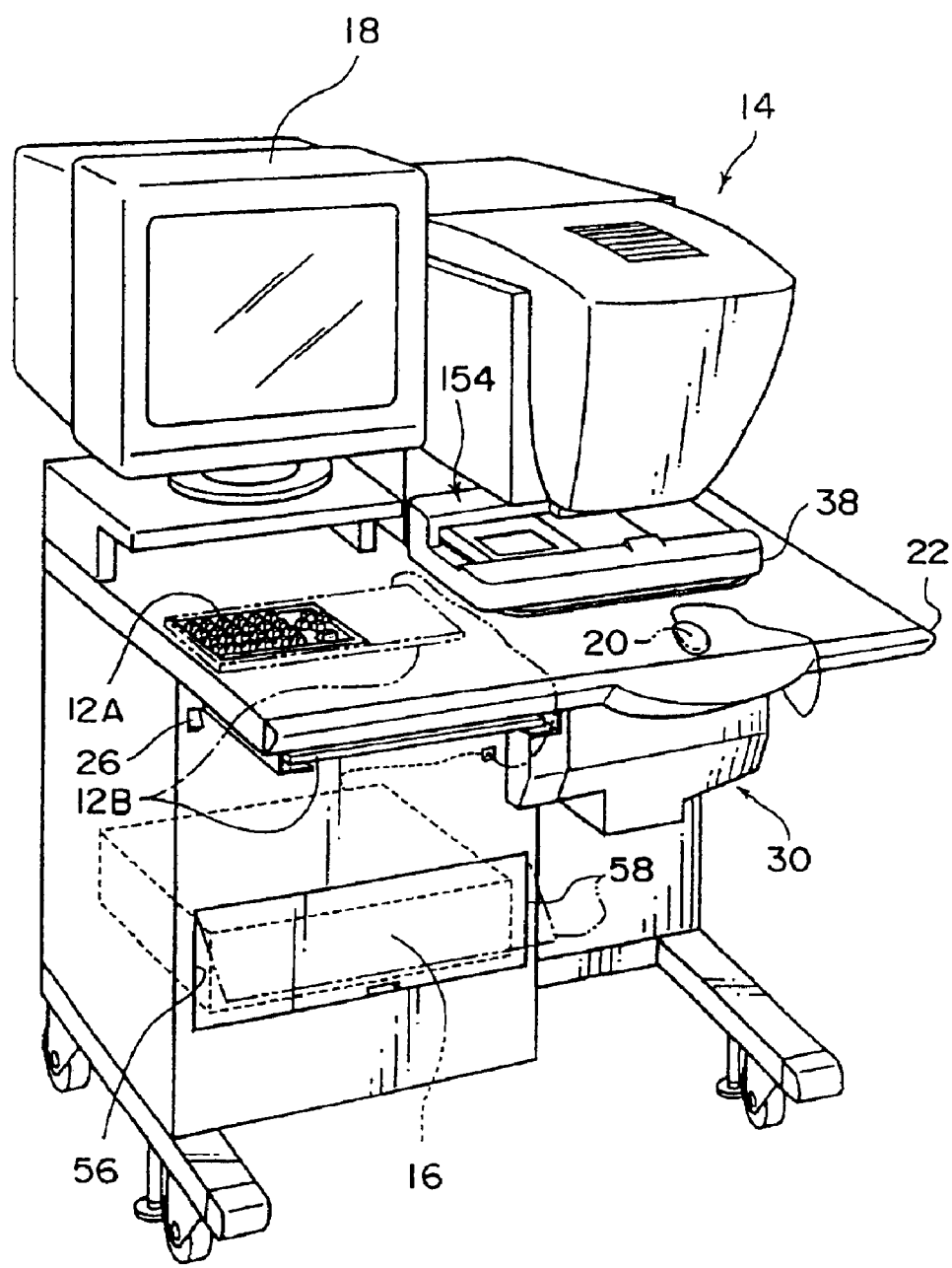
FIG. 1 is an external view of an image reading apparatus with a film carrier being mounted thereto relating to a first embodiment of the present invention.
Figure 2:
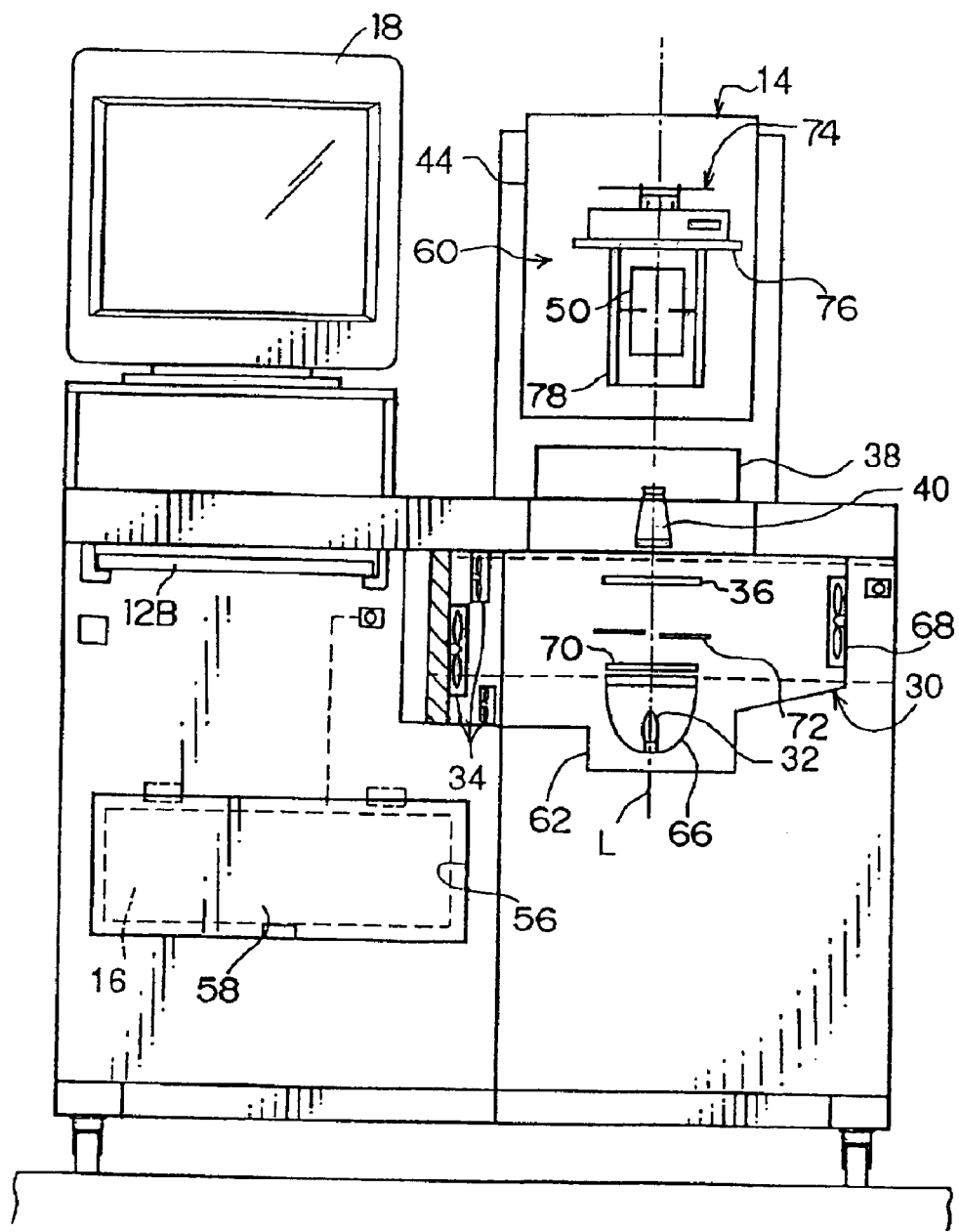
FIG. 2 is a front sectional view of an optical system of the image reading apparatus with the film carrier being mounted thereto relating to the first embodiment of the present invention.
Figure 3:
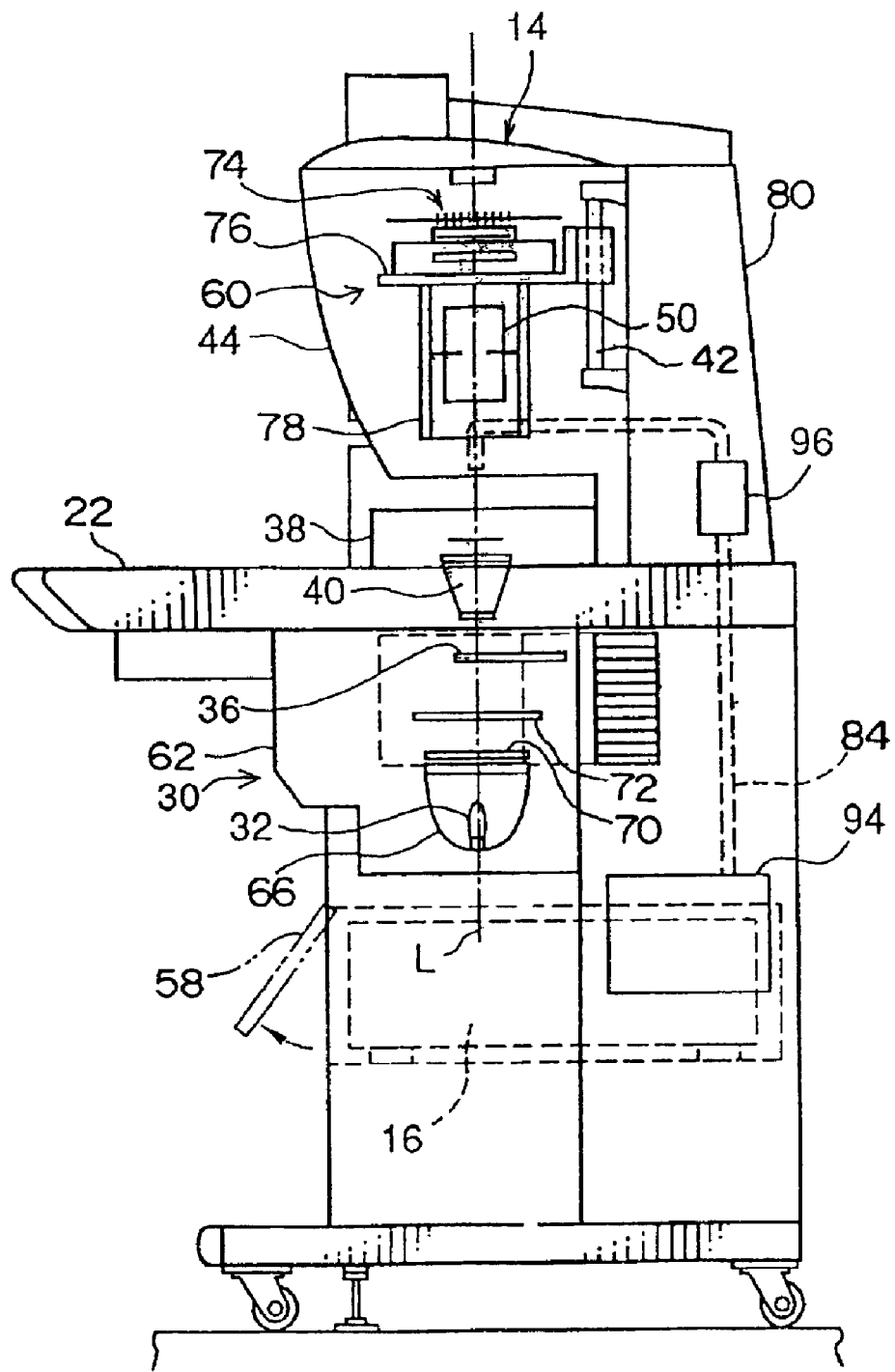
FIG. 3 is a side sectional view of the optical system of the image reading apparatus with the film carrier being mounted thereto relating to the first embodiment of the present invention.

As shown in FIGS. 1 to 3, an image reading apparatus 14 is provided at a work table 22, which is equipped with a personal computer 16, a mouse 20, two types of keyboards 12A and 12B, and a display 18.

One of the keyboards, the keyboard 12A, is embedded in a work surface of the work table 22 so as to be level therewith. When not in use, the other keyboard, the keyboard 12B, is accommodated within frames which are substantially L-shaped and provided under the work table 22. In this way, the keyboard 12B does not become obstructive.

When in use, the keyboard 12B is laid on the keyboard 12A. At this time, the cord of the keyboard 12B is connected to a connector which is connected to the personal computer 16. By disposing the connector at the front of the work table 22, it is not necessary for an operator to bend over to connect the cord of the keyboard 12B to the personal computer 16. A switch 26 for starting up a system is provided at the left front side of the work table 22.

The cord of the mouse 20 is connected to a connector which is connected to the personal computer 16. The connector is disposed at the right side of the work table 22.

The personal computer 16 is accommodated within an accommodating portion 56 provided below the work table 22 so as not to become obstructive. An opening of the accommodating portion 56 is closed off from the exterior by a door 58 so that the personal computer 16 is not unintentionally activated by the operator's foot or the like carelessly touching the personal computer 16. The operator can easily install a new software on the personal computer 16 by opening the door 58 toward the front.

The image reading apparatus 14 is used to read a film image recorded on a photographic photosensitive material, for example, a photographic film such as a negative film or a reversal film (hereinafter simply referred to as a "photographic film"). Examples of photographic films whose film images can be read include 135-size photographic films, 110-size photographic films, photographic films with a transparent magnetic layer formed thereon (i.e., 240-size photographic films which are so-called APS films), and 120-size and 220-size (Brownie size) photographic films.

The photographic film mentioned herein refers to the film which has been subjected to development such that a negative image or positive image formed on the film has been made visible after an object has been photographed.

The personal computer 16 is structured to allow input of image data outputted from the image reading apparatus 14. Further, the personal computer 16 effects image processings, including various corrections, on the inputted image data and then outputs the corrected image data, as image data for recording, to an unillustrated laser printer section.

An optical system of the image reading apparatus 14 includes a light source section 30 disposed below the work table 22, a light diffusion box 40 supported by the work table 22, a film carrier 38 set on the work table 22, and a reading section 60 disposed at the side of the work table 22 opposite to the side at which the light source section 30 is disposed.

The light source section 30 is accommodated within a metal casing 62. A lamp 32, such as a halogen lamp, a metal halide lamp, or the like, is disposed within the casing 62.

A portion of light emitted from the lamp 32 is reflected by a reflector 66 and irradiated in a fixed direction. A plurality of fans 34 and 68 are provided on the sides of the reflector 66. The fans 34 and 68 are operated when the lamp 32 is turned on, so as to prevent overheating of the interior of the casing 62.

As shown in FIGS. 1 to 3, a UV/IR filter 70, a diaphragm 72, and a balance filter 36 are provided on the light emission side of the reflector 66 along an optical axis L of light reflected by the reflector 66. The UV/IR filter 70 absorbs light having wavelengths in the ultraviolet and infrared regions and so prevents an increase in the temperature of the photographic film, such that high reading accuracy is ensured. The diaphragm 72 adjusts the amount of light from the lamp 32 and the reflector 66. The balance filter 36 appropriately sets the color components of the light which reaches the reading section 60 according to the type of the photographic film (negative film or reversal film) being read. The diaphragm 72 is formed by a pair of plate-like members with the optical axis L interposed therebetween, and is slidably disposed so that the pair of the plate-like members move toward and away from each other.

The diffusion box 40 is formed in such a manner that, closer to the upper portion thereof, the diffusion box 40 becomes narrower in the direction in which the photographic film is conveyed by the film carrier 38 and becomes wider in the direction perpendicular to the direction in which the photographic film is conveyed.

Light entering the diffusion box 40 is, toward the film carrier 38 (i.e., toward the photographic film), made into slit light whose longitudinal direction coincides with the transverse direction of the photographic film, and further is made into diffused light by the light diffusion plates and then exits the diffusion box 40. Due to light exiting from the diffusion box 40 being made into diffused light as described above, nonuniformity in the amount of light irradiated onto the photographic film is alleviated, and a uniform amount of slit light is illuminated onto the film image. Further, even when scratches are present on the film image, the scratches are prevented from becoming conspicuous.

A loading stand 76, on the upper surface of which a linear CCD 74 is mounted, is provided within the casing 44 of the reading section 60, and a plurality of support rails 78 hang down from the loading stand 76.

In order to carry out a change of magnification such as reduction, enlargement or the like, a lens unit 50 is supported inside the support rails 78 so as to be slidably movable in directions toward and away from the work table 22. A supporting frame 80 is formed upright on the work table 22. The loading stand 76 is supported by a guide rail 42 mounted to the supporting frame 80 in such a manner as to be slidably movable in directions toward and away from the work table 22 so that a conjugate length can be ensured during the above-mentioned change of magnification or automatic focusing.

The lens unit 50 is formed by a plurality of lenses, and a lens diaphragm is provided among these lenses. The lens diaphragm changes the amount of light passing therethrough.

The linear CCD 74 is structured such that a sensing portion, in which a large number of photoelectric conversion elements such as CCD cells or photodiodes are disposed in a row in the transverse direction of the photographic film and an electronic shutter mechanism is disposed, is provided in each of three parallel lines which are spaced apart from each other and color separation filters of R, G, and B are respectively mounted on the light-entering side of the sensing portions. (Namely, the linear CCD 74 is a so-called three-line color CCD.)

Further, transfer portions each formed by a plurality of CCD cells are provided in the vicinity of each of the sensing portions so as to correspond to the respective sensing portions. The charge accumulated in each of the CCD cells of each sensing portion is transferred via the corresponding transfer portion.

Further, a CCD shutter is provided on the light-entering side of the linear CCD 74. The CCD shutter is switched between a completely closed state in which light otherwise made incident on the linear CCD 74 is blocked for dark correction, a completely open state in which light is made incident on the linear CCD 74 for normal reading or light correction, and a reduced light state in which light to be made incident on the linear CCD 74 is decreased.

A compressor 94 which generates cooling air for cooling the photographic film is provided at the work table 22. Cooling air generated by the compressor 94 is guided by a guide pipe 84 and supplied to the film carrier 38. In this way, an area of the photographic film which is positioned at the scanning section can be cooled. The guide pipe 84 passes through a flow rate sensor 96 which detects the flow rate of cooling air.

Figure 4:
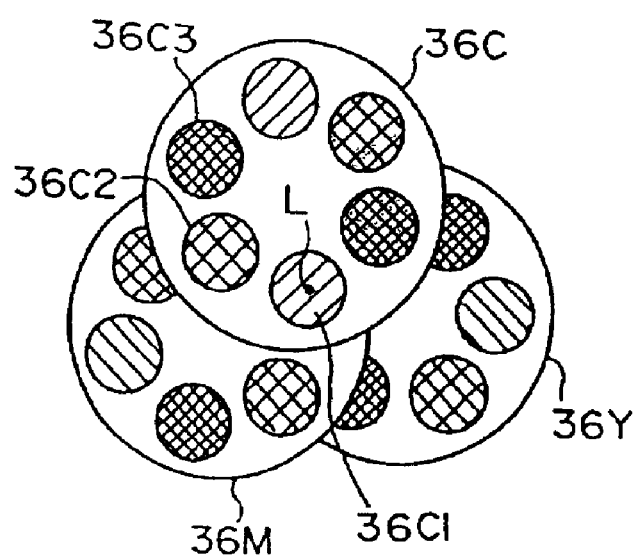
FIG. 4 is a schematic view of a turret illustrating a modified example.

As shown in FIG. 4, the combination of a turret 36C for cyan filters which absorb red light, a turret 36M for magenta filters which absorb green light, and a turret 36Y for yellow filters which absorb violet light may also be used as the turret 36. A plurality of cyan filters 36C1, 36C2, and 36C3 having different densities are fitted into the turret 36C. The density increases in the order of the cyan filters 36C1, 36C2, and 36C3. The other turrets 36M and 36Y have a similar structure. Further, each of the turrets 36C, 36M, and 36Y is rotatably supported so that the selected filters of the respective turrets are superimposed on the optical axis L.

Figure 11:
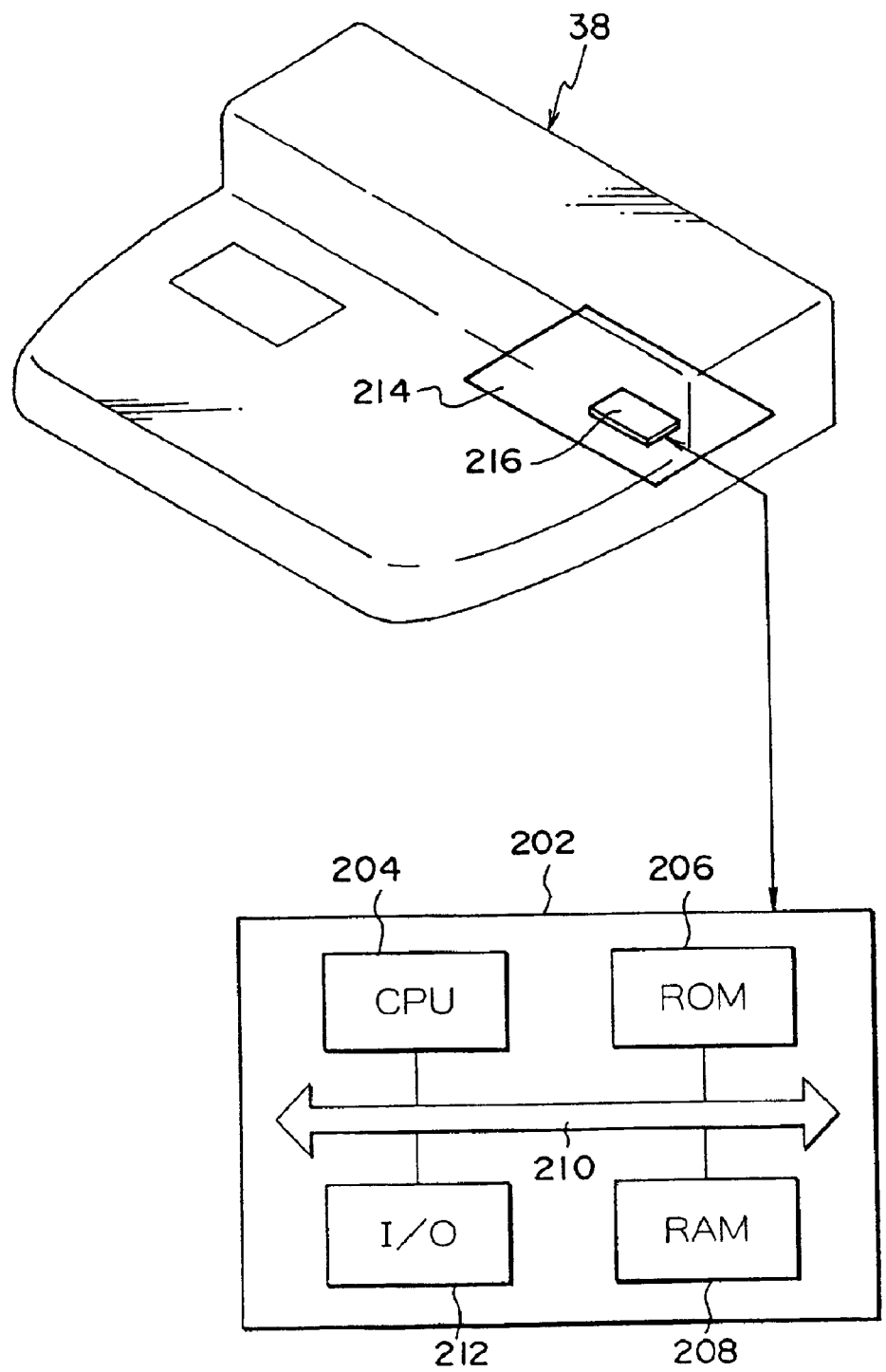
FIG. 11 is a schematic explanatory view showing the connection between the image reading apparatus and the film carrier relating to the first embodiment of the present invention.

As shown in FIG. 11, a control section 202 is provided at the personal computer 16 of the image reading apparatus 14. The control section 202 includes a CPU 204, a ROM 206, and a RAM 208 connected to each other via a bus 210, and is connected via an I/O 212 to an EEPROM 216 mounted on a substrate 214 of the film carrier 38, which will be described later. A program for controlling the reading of correction data and a correction data resetting program, both of which will be described later, are stored in the ROM 206. The RAM 208 is non-volatile so as to store data for a structure which will be described later.

[Structure of the Film Carrier]

Figure 5:
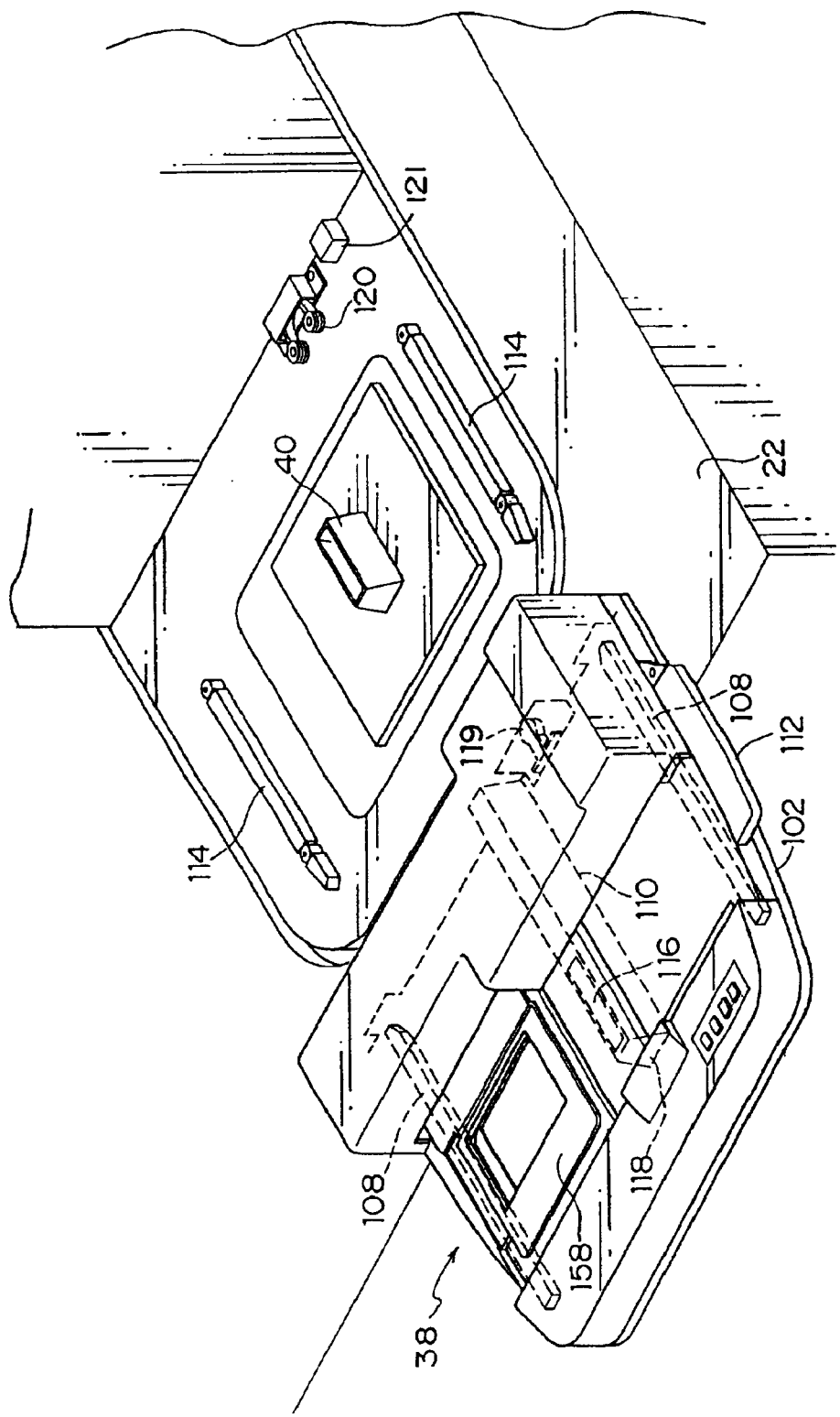
FIG. 5 is a perspective view showing the relationship between the film carrier and a mounting portion relating to the first embodiment of the present invention.

As shown in FIG. 5, guide grooves 108 and an insertion path 110 in which the diffusion box 40 is fitted are formed at the back surface of a base 102 of the film carrier 38. The film carrier 38 is positioned relative to the work table 22 (i.e., a slit 116 in the base 102 is positioned on the optical axis L of the light source section 30) by holding handles 112 and mounting the guide grooves 108 onto guide rails 114 which are provided at both sides of the diffusion box 40. At this time, a male ball catch 119 provided at a side surface of the base 102 engages with a female ball catch 120 formed at a front wall of the work table 22, thereby locking the film carrier 38 onto the work table 22.

Figure 6:
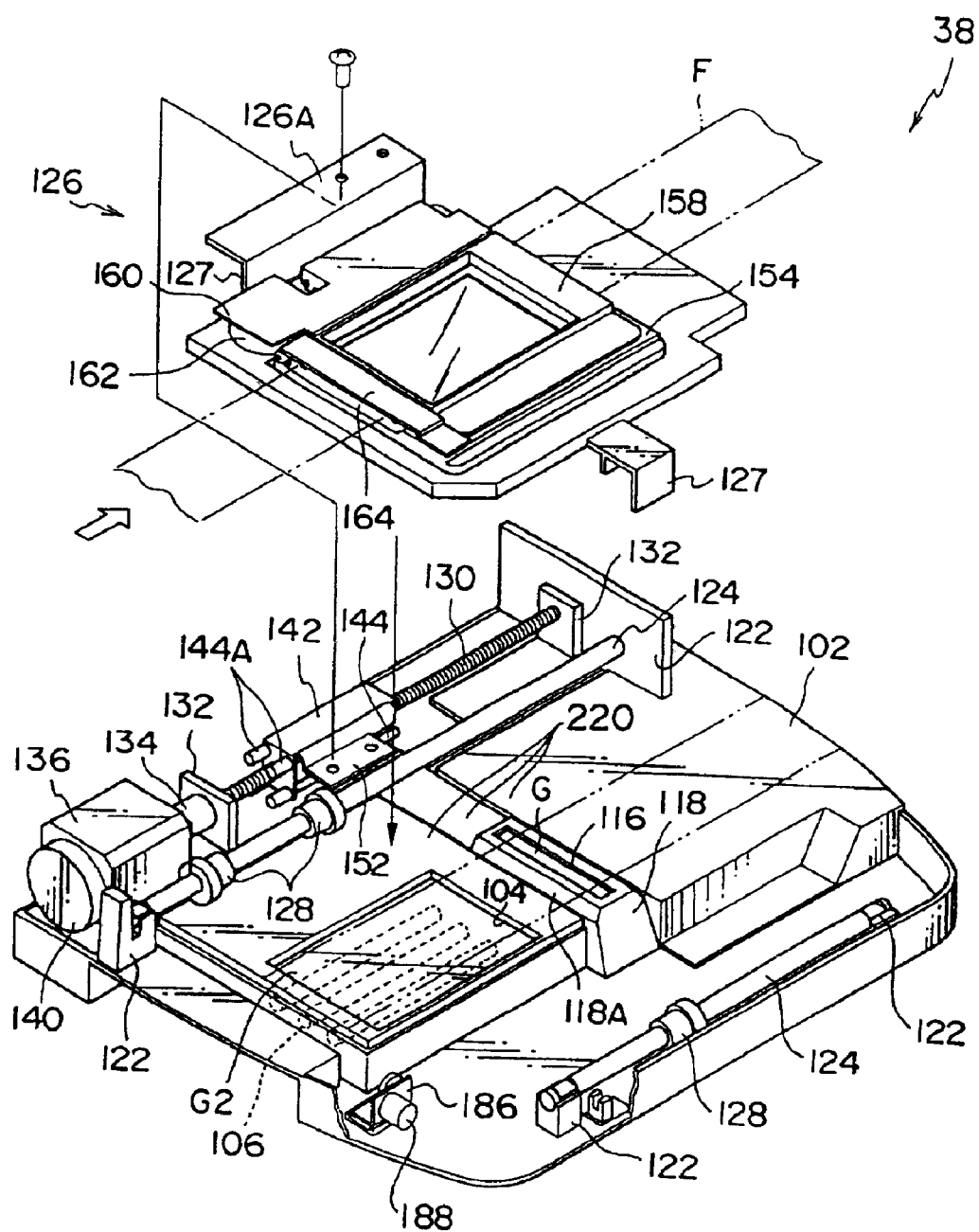
FIG. 6 is an exploded perspective view of the film carrier relating to the first embodiment of the present invention.
Figure 7:
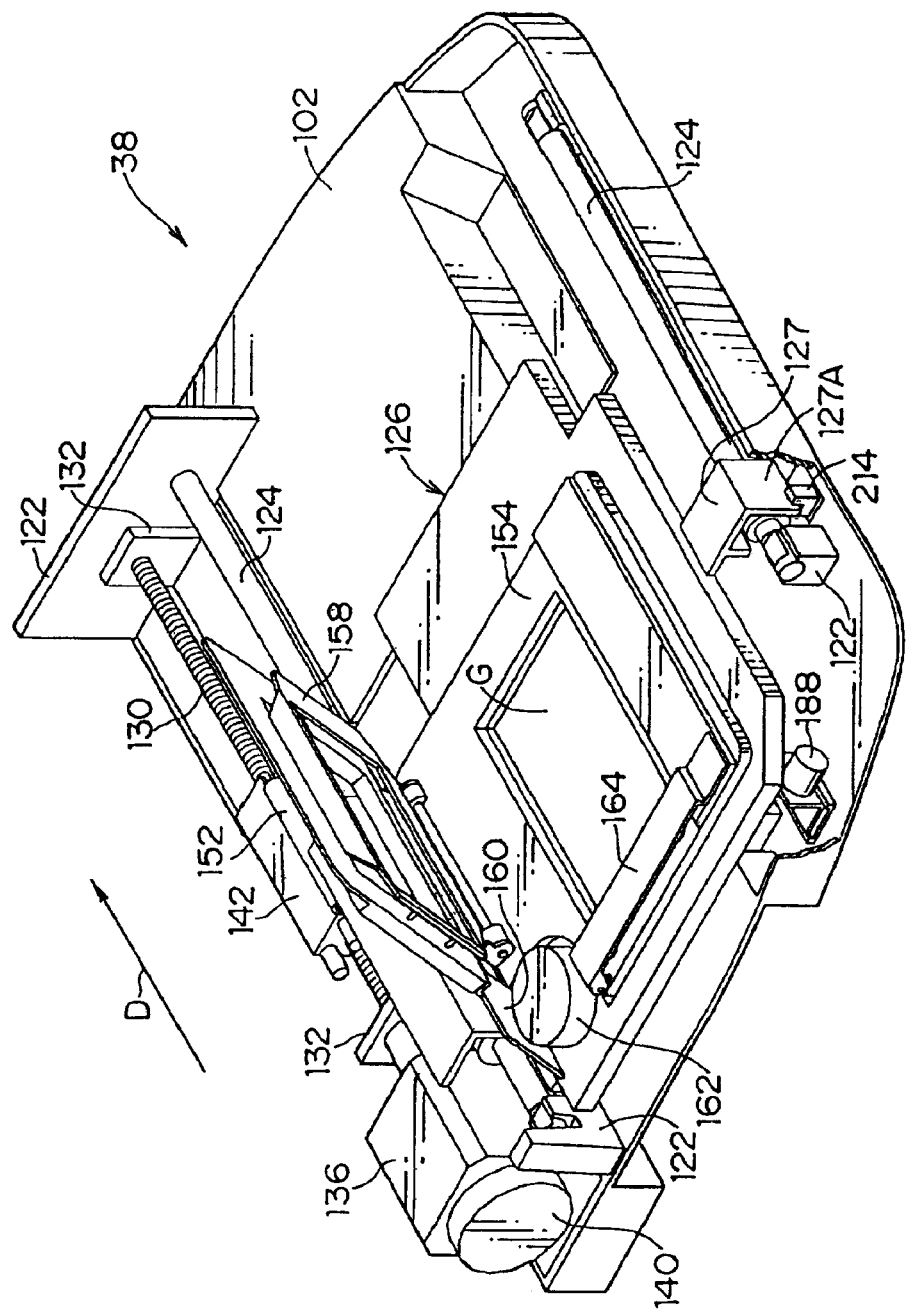
FIG. 7 is a perspective view of the film carrier relating to the first embodiment of the present invention.

Further, as shown in FIGS. 6 and 7, the slit 116 is formed in the base 102 above the diffusion box 40 (i.e., on the optical path of the light source section 30) for irradiating slit light onto the photographic film F. The slit 116 is formed on the top surface of a box 118 which is open toward the bottom and has tapered surfaces 118A at corner portions of the top surface. A cover 220 is laid in the vicinity of the box 118, and the slit 116 is covered with glass G so that the surface of the glass G is level with the cover 220. With this structure, foreign matter does not fall into the light source section 30 (see FIG. 2). In the above-described structure, the slit 116 is covered with glass. However, the slit 116 may be covered with a semitransparent plate such as a diffuser, a mesh, or any material as long as it transmits light.

Further, as shown in FIG. 6, cold-cathode tubes 106 are disposed on the base 102 in an opening 104. Frosted glass G2 is disposed over the cold-cathode tubes 106, thereby forming a schaukasten.

Guide shafts 124, which are supported by supports 122, are disposed at the sides of the end portions of the slit 116 in a longitudinal direction thereof, so that the guide shafts 124 are parallel to each other and orthogonal to the slit 116. Brackets 127 for an table 126 for an original are slidably supported by the guide shafts 124 via sliding bearings 128.

A feed screw 130 is disposed at the outer side of one of the guide shafts 124 so as to be parallel thereto. The end portions of the feed screw 130 are rotatably supported by brackets 132. One of the end portions of the feed screw 130 is directly connected to a drive shaft of a pulse motor 136 by a coupling 134.

A hand knob 140 is provided at the drive shaft of the pulse motor 136. The hand knob 140 can be rotated by hand such that the feed screw 130 is rotated and the table 126 for an original is moved. In this way, during maintenance, the table 126 for an original can be moved by hand so that the position of a sensor can be checked.

Further, as shown in FIG. 6, a horizontal portion of a plate spring 152 which is bent in a substantially L-shape is fixed to a holder 142 by screws. A vertical portion of the plate spring 152 is fixed to a horizontal portion 126A of the table 126 for an original. In this way, the table 126 for an original is connected to the holder 142 at the plate spring 152.

In the above-described structure, when the feed screw 130 is rotated by the pulse motor 136, a fixed nut and a biased nut are moved, thereby sliding the table 126 for an original along the guide shaft 124.

Moreover, the relationship between the positions of the table 126 for an original and the feed screw 130 (i.e., parallel movement of the table 126 for an original in horizontal and vertical planes relative to the optical axis L) is constantly maintained due to a restoring force of the plate spring 152. Therefore, the table 126 for an original is well aligned with the feed screw 130, and no minute adjustments are necessary when the table 126 for an original is connected to the holder 142.

Figure 8:
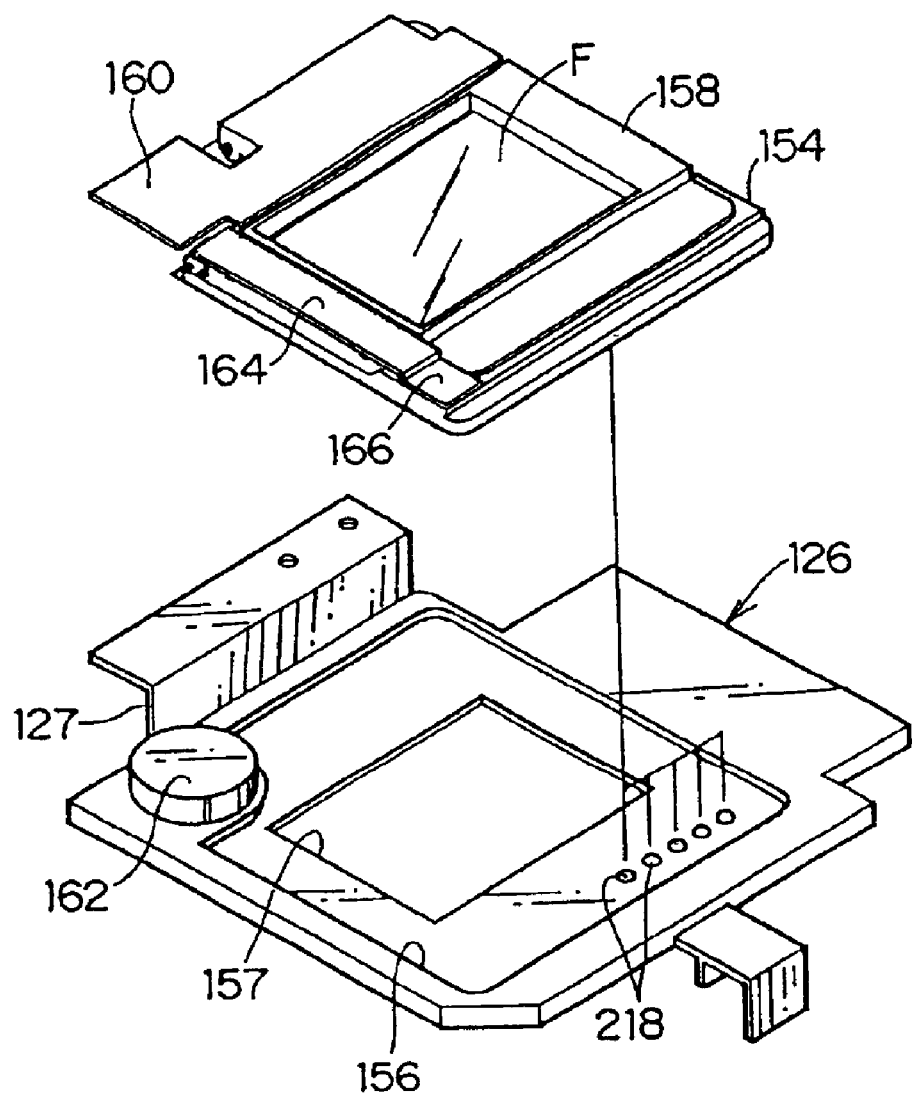
FIG. 8 is an exploded perspective view showing the relationship between a mask and a pressure plate of the film carrier relating to the first embodiment of the present invention.

As shown in FIG. 8, the table 126 for an original has a mounting portion 156 into which a mask 154 is set. The mounting portion 156 is formed in a concave shape so as to correspond to the shape of the mask 154. An opening 157 is formed in the center of the mounting portion 156. Slit light is irradiated from the slit 116 through the opening 157 onto the photographic film F which is set in the mask 154.

Figure 9:
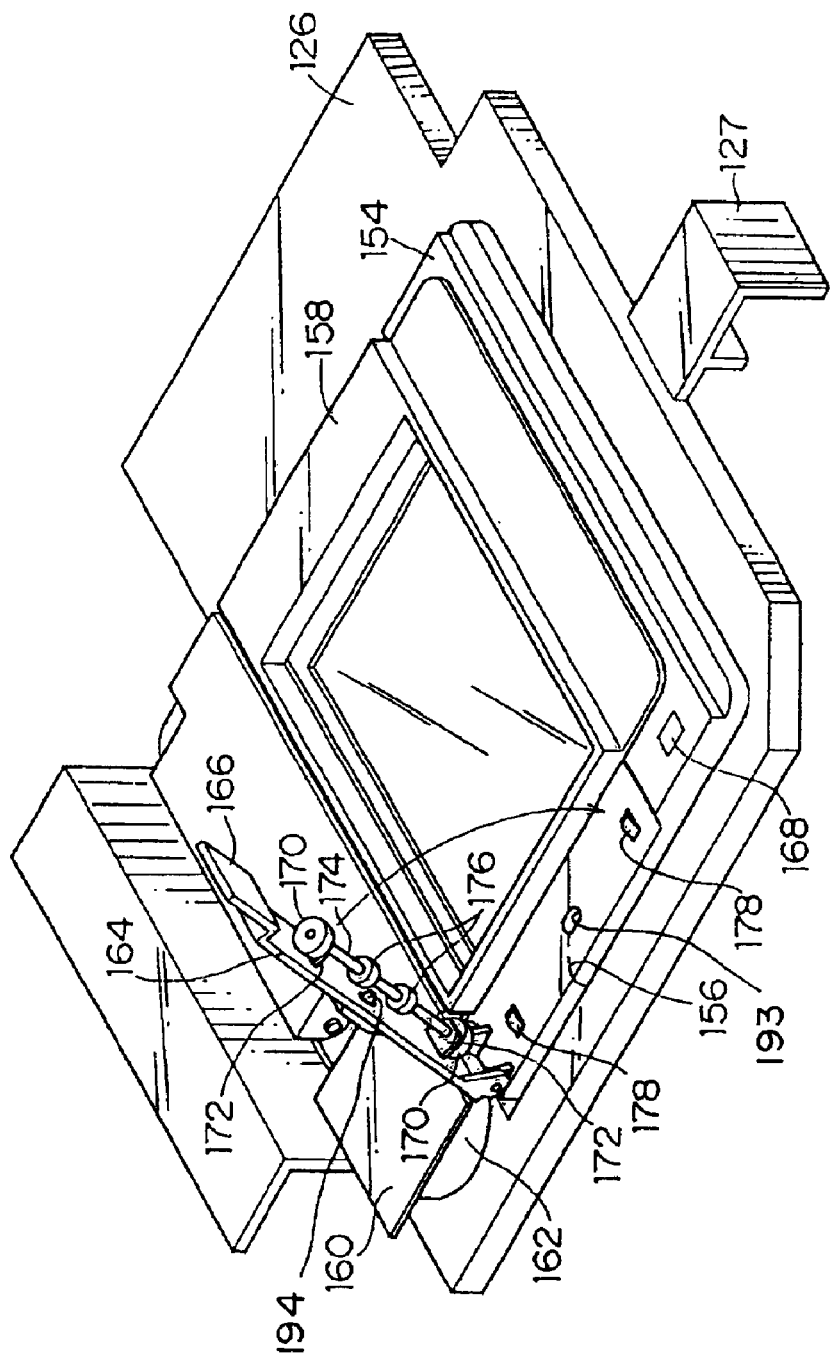
FIG. 9 is a perspective view of the mask and the pressure plate of the film carrier relating to the first embodiment of the present invention.
Figure 10:
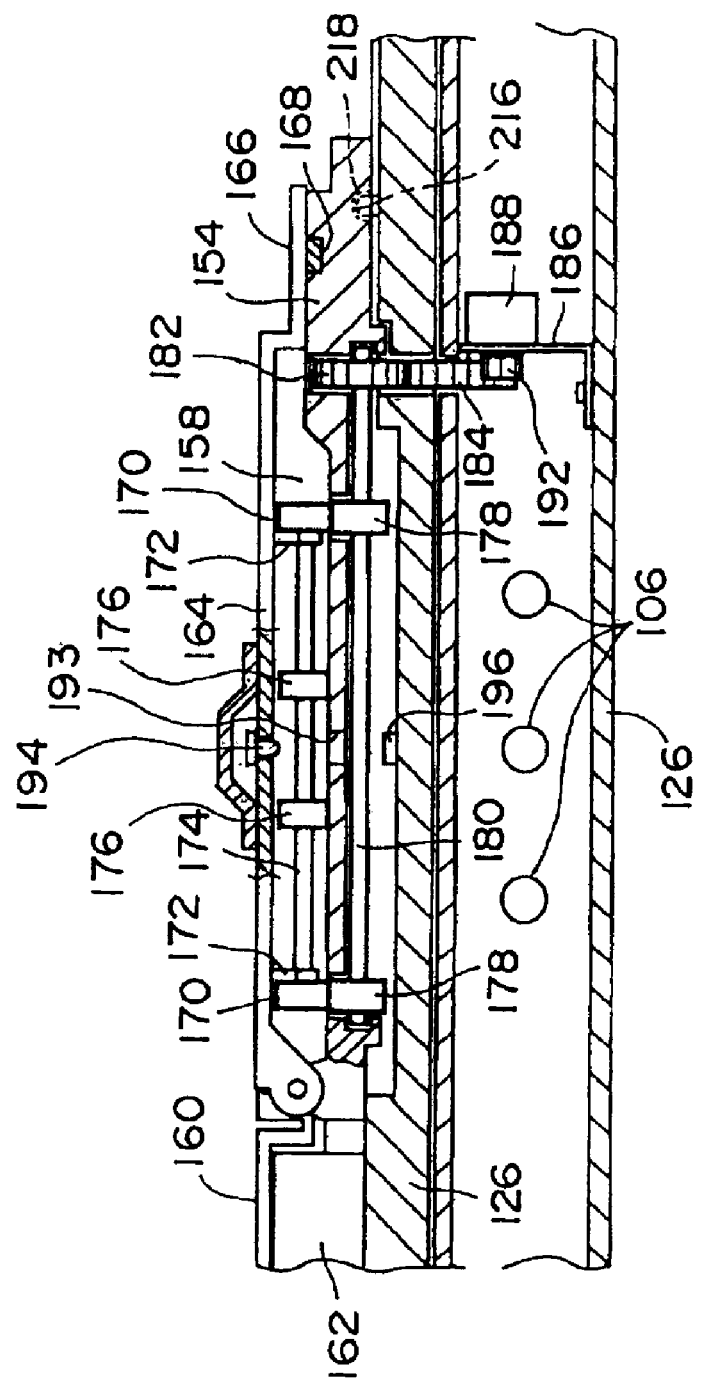
FIG. 10 is a cross-sectional view of a roller of a pressing plate of the film carrier relating to the first embodiment of the present invention.

As shown in FIGS. 9 and 10, the mask 154 has a pressure plate 158. The pressure plate 158 is supported by a shaft so as to be inclined, such that the photographic film F is held between the pressure plate 158 and the mask 154. An attracted plate 160 is provided at an end portion of the pressure plate 158. The attracted plate 160 is attracted to a solenoid 162 provided on the table 126 for an original, thereby accurately setting the mask 154 in the table 126 for an original.

Further, the mask 154 has a pressing plate 164 which is supported at an incline by a shaft. The pressing plate 164 is held in a closed state by an attracted plate 166 being attracted to a magnet 168 provided on the table 126 for an original. Axial plates 172 are provided on the rear surface of the pressing plate 164 at the left side in FIG. 9. A shaft 174, to which driven rollers 170 formed of rubber are mounted, is supported by the axial plates 172. Further, feed rollers 176 are disposed at central portions of the shaft 174.

The top surfaces of drive rollers 178 are exposed at the surface of the mask 154 so that the drive rollers 178 and the driven rollers 170 nip each other. The drive rollers 178 are mounted to a roller shaft 180 which is supported on the rear surface of the mask 154. A transmission gear 182 is provided at an end portion of the roller shaft 180. The transmission gear 182 meshes with a driving gear 184, which is provided on the base 102, at an original position of the table 126 for an original. As shown in FIG. 10, the driving gear 184 meshes with a driving gear 192 of a pulse motor 188, which is supported by a bracket 186.

With the above-described structure, when the table 126 for an original returns to its original position, the pulse motor 188 can be driven such that the photographic film is conveyed, frame by frame, by the driven rollers 170, the drive rollers 178, and the feed rollers 176.

Further, as shown in FIGS. 9 and 10, a transmission sensor for detecting the presence of a film is formed by a light emitting element 194 disposed at the pressing plate 164 and a light receiving element 196 disposed at the table 126 for an original at a position corresponding to the light emitting element 194. Namely, the presence of a film is detected based on the amount of light which is emitted from the light emitting element 194 and enters the light receiving element 196 through a hole 193.

Moreover, as shown in FIG. 10, a depression 216 is formed in the under surface of the mask 154. When the mask 154 is set on the table 126 for an original, a portion of the mask 154 other than the depression 216 is pressed against one of switch buttons 218 (5-bit sensors) so that the size of the opening of the mask 154 is determined.

In the film carrier 38 having the above structure, the long photographic film F such as Brownie-size photographic film is interposed between the mask 154 and the pressure plate 158, such that pre-scanning is carried out when the table 126 for an original is moved in a direction of arrow D in FIG. 7 and fine scanning is carried out when the table 126 for an original is moved in the direction opposite to the direction of arrow D.

Further, as shown in FIG. 11, a substrate 214 is provided inside the film carrier 38. Correction data unique to the film carrier, such as the conveying capability, the focusing position, and output values from a film detection sensor, is tested at the time of factory shipment, and the identification number for identifying the film carrier 38 is stored in the EEPROM 216 mounted on the substrate 214.

A method of resetting correction data by using the film carrier 38 (the image reading apparatus 14) having the above structure will be described in detail.

When the film carrier 38 is mounted on a predetermined position of the work table 22, the EEPROM 216 mounted on the substrate 214 of the film carrier 38 is connected to the control section 202 of the personal computer 16 by an unillustrated connector. At this time, a program for controlling the reading of correction data which is stored in the ROM 206 is activated in the control section 202.

Figure 12:
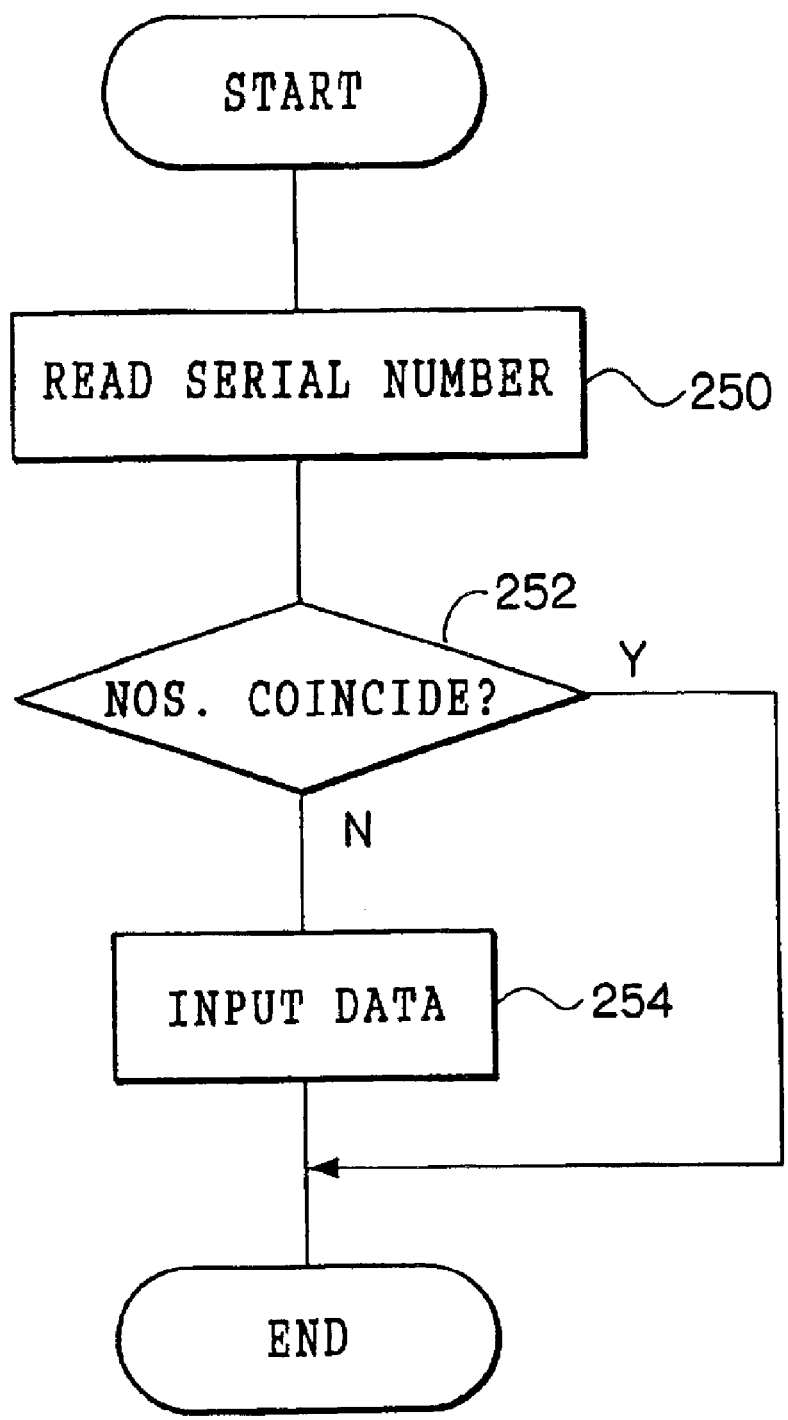
FIG. 12 is a flow chart of a correction data reading program.

Specifically, as shown in FIG. 12, when the EEPROM 16 is connected to the control section 202, the control section 202 reads the identification number (serial number) of the film carrier from the EEPROM 216 (step 250).

Subsequently, it is determined whether the identification number which has been read corresponds to one of the identification numbers stored in the RAM 208 (step 252). This is to determine whether the film carrier 38 is the same as the film carrier whose correction data has already been read.

When the identification number corresponds to one of the stored identification numbers, it signifies that the correction data for the film carrier 38 being used has already been inputted, and the process ends.

When the identification number which has been read does not correspond to any of the identification numbers stored in the RAM 208, it signifies that the film carrier 38 is new. Therefore, correction data for the new film carrier 38 is read from the EEPROM 216 and inputted to the control section 202. The new correction data is stored in the RAM 208 with the identification number (step 254).

In this way, correction data for each film carrier 38 is stored in the control section 202 of the image reading apparatus 14.

In the image reading apparatus 14, the conveying capability and the focusing position of the film carrier 38, a threshold value for determining the presence of a film in the film carrier 38 based on the amount of light detected by the light receiving element 196, and the like are set based on the correction data. After the threshold value has been set based on the correction data, the light emitting element 194 is turned on, and the amount of light emitted from the light emitting element 194 and entering the light receiving element 196 through the hole 193 is detected. A value outputted from the light receiving element 196 when no film is loaded in the film carrier 38 is detected, and the threshold value, which has been set, is adjusted.

The threshold value which has been adjusted (hereinafter referred to as "new correction data") is stored in the RAM 208 of the control section 202. Image reading is carried out based on the new correction data (i.e., the adjusted threshold value) until the film carrier 38 is removed. In this way, image reading can be accurately carried out.

However, unlike the correction data, the new correction data is not retained in the control section 202 after the image reading. The reason is that, even if the same film carrier 38 is mounted in the image reading apparatus 14, the adjusted threshold value (new correction data) may be inappropriate due to variations in the amount of light caused by deterioration or contamination of the lamp 32. Therefore, every time the film carrier 38 is loaded in the image reading apparatus 14, the threshold value is adjusted based on the correction data before the adjustment.

The correction data stored in the EEPROM 216 can be changed when an operator does periodic maintenance of the image reading apparatus 14. When the variation in the amount of light from the lamp 32 is large, significant adjustment of the correction data is necessary every time the film carrier 38 is loaded in the image reading apparatus 14. Accordingly, the amount of adjustment is reduced by changing the correction data.

When the substrate 214 of the film carrier 38 breaks down and needs to be replaced, the correction data is reset as follows.

When the substrate 214 of the film carrier 38 is replaced, the EEPROM 216 mounted on the substrate 214 is also replaced. Thus, after the replacement of the substrate 214, the film carrier 38 includes a new EEPROM 216 having no correction data, except the identification number of the film carrier 38.

An operator inputs, via the keyboard 12A or the mouse 20, into the personal computer 16 that the film carrier 38 which requires resetting is to be mounted in the main body of the apparatus. As a result, when the film carrier 38 is mounted in the main body of the apparatus, the correction data resetting program, rather than the program for controlling the reading of correction data, is activated. First, the control section 202 reads the identification number from the EEPROM 216 and searches for the identification number among the identification numbers stored in the RAM 208 that corresponds to the read identification number.

Correction data for the film carrier having the corresponding identification number is read from the RAM 208 and then written into the EEPROM 216.

As described above, in the present embodiment, when the film carrier 38 is mounted in the main body of the image reading apparatus 14 for the first time, correction data stored in the EEPROM 216 is read and stored in the control section 202 of the main body of the apparatus. Therefore, even if the substrate 214 of the film carrier 38 is replaced due to a breakdown and the EEPROM 216 having the correction data stored therein is lost, the correction data can be easily reset by writing the correction data stored in the image reading apparatus 14 into a new EEPROM 216. Namely, there is no need for a complicated process in which the correction data for the film carrier 38 is detected and written into the EEPROM 216.

In the present embodiment, the correction data is stored in the non-volatile RAM 208 of the control section 202. However, the recording medium is not limited to the RAM 208. For example, the correction data may be stored on a floppy disk or the like.

Further, in the present embodiment, it is determined whether or not the correction data has been inputted, based only on the identification number of the film carrier 38. However, the present invention may be structured such that version information is used as well as the identification number. In this way, new correction data is inputted into the control section 202 at the time of version upgrade.

Second Embodiment

Next, a system for managing information on a film carrier according to a second embodiment of the present invention will be described with reference to FIG. 13. Components of the present embodiment which are similar to those of the first embodiment are designated by the same reference numerals, and detailed description thereof will be omitted. The present second embodiment is applied to, for example, a shop (laboratory) where a plurality of image reading apparatuses are used.

As shown in FIG. 13, the system for managing information on a film carrier includes a plurality of image reading apparatuses 14A to 14C. The respective image reading apparatuses 14A to 14C can output image data to an unillustrated printing processor. Namely, photographic prints can be formed by the printing processor based on the image data read by any of the image reading apparatuses 14A to 14C.

Moreover, the image reading apparatuses 14A to 14C operate in the same way as the personal computer 16 (control section 202) of the first embodiment, and detect information on the use of the film carrier 38 (including production information and operating information, which will be described later) when image reading is to be carried out by loading the film carrier 38 in the image reading apparatuses 14A to 14C.

Personal computers 16A to 16C are respectively connected to a server 300 and can transmit information relating to the film carrier 38, such as the information on the use of the film carrier 38, the correction data, and the like, to the server 300 along with the identification number of the film carrier 38.

The server 300 stores the information on the use of the film carrier 38 and the correction data with the identification number of the film carrier 38. When new information on the use of the film carrier 38 is inputted to the server 300, the server 300 adds the new information to the existing information on the use of the film carrier 38 which has the corresponding identification number.

The system for managing information on a film carrier having the above structure will be described.

First, a new film carrier 38 is loaded into the image reading apparatus 14A, and the control section 202 of the personal computer 16A reads the identification number of the film carrier 38.

In the same way as in the first embodiment, the control section 202 determines whether the identification number is new. When the control section 202 determines that the identification number is new, correction data of the film carrier 38 is read and stored in the RAM 208 with the identification number.

Further, the control section 202 outputs the identification number to the server 300. The server 300 also determines whether or not the identification number is new. When the server 300 determines that the identification number is new, the correction data relating to the identification number is read from the control section 202.

In the image reading apparatus 14A, the correction data is read into the RAM 208 in the same way as in the first embodiment. New correction data, which is adjusted correction data, is stored in the RAM 208, and the image reading apparatus 14A and the film carrier 38 are operated based on the new correction data. In this way, accurate image reading is carried out regardless of the difference in the characteristics of the film carriers 38.

When image reading is carried out as described above by the film carrier 38 in the image reading apparatus 14A, the personal computer 16A of the image reading apparatus 14A detects operating information, production information, and the like of the film carrier 38.

The operating information refers to data on the number of rotations, conducting time, and the like of the pulse motors 136 and 188 of the film carrier 38. The production information refers to data on the type of the film and the number of frames which have been read. Such data is stored in the personal computer 16A.

When the image reading apparatus 14A (personal computer 16A) detects that the film carrier 38 has been removed, the image reading apparatus 14A determines that image reading by the film carrier 38 is completed, and outputs the operating information and the production information, which have been detected (added) so far, to the server 300, along with the identification code for each of the operating information and the production information, and the identification number of the film carrier 38. The server 300 determines whether there is data with the same identification number and identification codes. When there is no such data, the data with the identification number and the identification codes is stored for the first time.

When the data with the same identification number and identification codes is already stored in the server 300, the respective data (such as the number of rotations of the pulse motors and the number of frames which have been read) stored in the personal computer 16A is added to the existing data in the server 300.

Subsequently, when the film carrier 38 is loaded into another image reading apparatus, for example, the image reading apparatus 14B, operating information and production information are inputted to the server 300 in the same way. In this case, since the operating information and the production information on the corresponding film carrier 38 are already stored in the server 300, the operating information and the production information are added to the existing data.

In this case, since the correction data for the film carrier 38 is already stored in the server 300, the correction data is not written into the server 300.

Further, when the film carrier 38 breaks down, the operating information and the production information which have been stored (added to the data) in the server before the breakdown are read from the server 300 and written into the EEPROM 216 of the film carrier 38 via the personal computer of the image reading apparatus in which the film carrier 38 is mounted, for example, the personal computer 16B of the image reading apparatus 14B. In particular, when the image reading apparatuses 14A to 14C use the same film carrier 38 as in the present embodiment as well, accurate operating information and production information from all of the image reading apparatuses can be inputted from the server 300 to the EEPROM 216.

Therefore, when the broken film carrier 38 is sent to a factory, the history of the film carrier 38 can be accurately acquired by reading the operating information and the production information from the EEPROM 216, and can be used for repairing the film carrier 38. Further, durability of the respective parts can be recognized, and the results of the inspection can be used for film carrier designs.

In the present embodiment, when the film carrier 38 breaks down, the information thereof is written into the EEPROM 216 of the film carrier 38. However, the production information and the operating information with the identification codes can also be transmitted to the factory via the Internet.

Moreover, in the present embodiment, after the substrate of the EEPROM 216 is replaced, the correction data is read from the image reading apparatus and written into a new EEPROM 216 of the film carrier 38, as in the first embodiment. However, the present embodiment is different from the first embodiment in that the correction data for the film carrier 38 is stored in the server 300. Therefore, in the case in which the film carrier 38 is mounted in the image reading apparatus 14C, in which the film carrier 38 has not been mounted, and the identification number for the film carrier 38 is not stored in the personal computer 16C (i.e., the personal computer 16C has no correction data for the film carrier 38), the correction data relating to the identification number can be read from the server 300 and written into the EEPROM 216 of the film carrier 38.

As described above, in the system for managing information on a film carrier relating to the present embodiment, the production information and the operating information of the film carrier is managed by the server 300. Therefore, even when the film carrier 38 is used by the plurality of image reading apparatuses, the production information and the operating information of the film carrier 38 can be accurately detected.

Accordingly, when the film carrier 38 breaks down, whether the breakdown is due to the life span of the motors being completed or due to other defects can be recognized based on the information on the use of the film carrier (i.e., the production information and the operating information). Therefore, coping with breakdowns of the film carriers becomes easy.

Further, the production information may include the number of prints of an image. This data can be outputted from the image reading apparatus to the printing processor along with the data for the image read by the film carrier 38. In this way, the number of prints can be compared with sales records of the prints, and private use of the image reading apparatus by the operator can be detected.

Furthermore, the identification number of the operator may be inputted to the image reading apparatus so that the production information includes the identification number of the operator. In this way, information such as the number of frames which have been read, the number of prints, and the like for each operator can be managed by the server and used as a reference for salary assessment of the operators.

Moreover, in the present embodiment, the server 300 is connected to the image reading apparatuses in the laboratory. However, the server 300 may be connected via leased lines or the Internet to the head and branch offices.

In the present embodiment, the personal computers 16A to 16C are provided in the image reading apparatuses 14A to 14C, respectively. However, in place of the above structure, the operating information and the production information stored in the image reading apparatuses 14A to 14C may be detected by the server 300, and the correction data may be directly inputted from the film carrier 38 to the server 300.

According to the present invention, when a carrier storage component in a carrier is replaced, correction data stored in the carrier can be easily reset by reading the correction data, which has been stored in an information management component or a main body storage component, and writing the data into a new carrier storage component.

Further, according to the present invention, carrier-related information can be accurately managed even when multiple image reading apparatuses use the same carrier.

What is claimed is:

1. A system for managing information on a carrier, comprising:
    a carrier for holding an image recording medium;
    a carrier storage component provided with the carrier and storing correction data unique to the carrier;
    an image reading apparatus which reads image information corresponding to the image recording medium held by the carrier when the carrier is mounted in the image reading apparatus; and
    an information management component which, if the information management component has no correction data for the carrier mounted in the image reading apparatus, reads the correction data for the carrier from the carrier storage component and stores the data,
    wherein, if the carrier storage component is replaced, the correction data for the carrier is read from the information management component and written into the replacement carrier storage component when the carrier is mounted in the image reading apparatus.

2. The system of claim 1, wherein the information management component reads the identification number unique to the carrier and the correction data from the carrier storage component and stores them, and it is determined, at the time of mounting the carrier in the image reading apparatus, whether the correction data for the carrier has been already stored in the information management component, based on whether the identification number read from the carrier storage component corresponds to at least one of the identification numbers stored in the information management component.

3. The system of claim 1, wherein the information management component is disposed with the image reading apparatus.

4. The system of claim 1, wherein the image reading apparatus having the correction data stored therein is operated based on the correction data, generates new correction data by adjusting the correction data, and reads, based on the new correction data, an image on the image recording medium held in the carrier.

5. The system of claim 1, wherein the carrier has a transmission sensor for detecting the presence of the image recording medium, and the correction data includes a threshold value for an amount of light for determining the presence of the image recording medium.

6. An image reading apparatus comprising:
    a carrier which holds and conveys an image recording medium for reading;
    a carrier storage component, which is provided inside the carrier, for storing correction data unique to the carrier; and
    a main storage component which reads the correction data from the carrier storage component and stores the data if, when the carrier is mounted in the image reading apparatus, it is determined that the carrier is mounted for the first time,
    wherein, if the carrier storage component is replaced, the correction data stored in the main storage component is read out and written into the replacement carrier storage component.

7. The apparatus of claim 6, wherein the main storage component reads an identification number unique to the carrier and the correction data from the carrier storage component and stores them, and it is determined, at the time of mounting the carrier in the image reading apparatus, whether the correction data for the carrier has been already stored in the main storage component, based on whether the identification number read from the carrier storage component corresponds to at least one of the identification numbers stored in the information management component.

8. The apparatus of claim 6, wherein the image reading apparatus having the correction data stored therein is operated based on the correction data, generates new correction data by adjusting the correction data, and reads, based on the new correction data, an image on the image recording medium held in the carrier.

9. The apparatus of claim 6, wherein the carrier has a transmission sensor for detecting the presence of the image recording medium, and the correction data includes a threshold value for an amount of light for determining the presence of the image recording medium.

* * * * *